(12) United States Patent
Song et al.

(10) Patent No.: US 10,860,280 B2
(45) Date of Patent: Dec. 8, 2020

(54) DISPLAY METHOD AND DEVICE

(71) Applicant: Baidu Online Network Technology (Beijing) Co., Ltd., Beijing (CN)

(72) Inventors: Ye Song, Beijing (CN); Bole Wang, Beijing (CN); Cong Chen, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/469,562

(22) PCT Filed: Apr. 10, 2017

(86) PCT No.: PCT/CN2017/079876
§ 371 (c)(1),
(2) Date: Jun. 13, 2019

(87) PCT Pub. No.: WO2018/107628
PCT Pub. Date: Jun. 21, 2018

(65) Prior Publication Data
US 2019/0391780 A1    Dec. 26, 2019

(30) Foreign Application Priority Data
Dec. 13, 2016 (CN) .......................... 2016 1 1147561

(51) Int. Cl.
*G06F 3/14* (2006.01)
*B60R 11/02* (2006.01)
*H04N 7/18* (2006.01)

(52) U.S. Cl.
CPC ........ *G06F 3/1454* (2013.01); *B60R 11/0229* (2013.01); *H04N 7/18* (2013.01)

(58) Field of Classification Search
CPC ......... G06F 3/1454; H04L 67/36; H04N 7/18; G09G 2380/10; G09G 2354/00; B60R 11/0229; B60L 2250/16; G07C 5/008
See application file for complete search history.

(56) References Cited

U.S. PATENT DOCUMENTS

| 2016/0212254 | A1* | 7/2016 | Akama | H04M 1/7253 |
| 2016/0240019 | A1* | 8/2016 | Tamp | G07C 5/085 |
| 2018/0073882 | A1* | 3/2018 | North | G01C 21/3691 |

FOREIGN PATENT DOCUMENTS

| CN | 104977018 A | 10/2015 |
| CN | 105094502 A | 11/2015 |

(Continued)

OTHER PUBLICATIONS

International Search Report for International Patent Application No. PCT/CN2017/079876, dated Aug. 29, 2017, with English translation (5 pages).

(Continued)

*Primary Examiner* — Abbas I Abdulselam
(74) *Attorney, Agent, or Firm* — Nixon Peabody LLP

(57) ABSTRACT

A display method and display apparatus. The method includes: receiving a display request sent by a vehicle-mounted terminal, the display request including an application identifier of a target application installed on a mobile terminal; in response to the received display request, determining whether the target application is in a running state, and arranging a storage space for the target application; in response to the target application being in a running state, starting to draw an interface of the running target application, and storing, in the storage space, interface data obtained by drawing; performing video encoding on the stored interface data to generate a video stream; and sending the generated video stream to the vehicle-mounted terminal (Continued)

so that the vehicle-mounted terminal displays the interface of the target application according to the video stream.

14 Claims, 7 Drawing Sheets

(56) References Cited

FOREIGN PATENT DOCUMENTS

| | | |
|---|---|---|
| CN | 105516460 A | 4/2016 |
| WO | WO 2015/033947 A1 | 3/2015 |

OTHER PUBLICATIONS

Written Opinion of International Searching Authority for International Patent Application No. PCT/CN2017/079876, dated Aug. 29, 2017, with English translation (7 pages).

\* cited by examiner

DISPLAY METHOD AND DEVICE

CROSS-REFERENCE TO RELATED APPLICATIONS

This application is a U.S. National Stage of International Application Patent No. PCT/CN2017/079876, filed on Apr. 10, 2017, which claims priority to Chinese patent application No. 201611147561.X, filed on Dec. 13, 2016, both of the aforementioned applications hereby incorporated by reference in their entireties.

TECHNICAL FIELD

The present disclosure relates to the field of computer technology, specifically to the field of vehicle-mounted display technology, and more specifically to a display method and apparatus.

BACKGROUND

With the intelligence of the mobile terminal and the improvement of the vehicle-mounted display function, images on a screen of a mobile terminal are projected onto a vehicle-mounted screen for display, facilitating the entertainment life of the driver or passenger during travelling. In particular, an image of an application running on the mobile terminal may be separately projected onto a vehicle-mounted terminal, for example, an image of a video playback application of the mobile terminal may be separately projected onto the vehicle-mounted terminal. The existing way of projecting images of an application of the mobile terminal onto the vehicle-mounted terminal is usually to mirror the interface of the target application on the physical screen of the mobile terminal to the vehicle-mounted terminal by the mirroring technology.

However, when the target application runs in the background, that is, the target application is not displayed on the physical screen of the mobile terminal, the vehicle-mounted screen cannot obtain the images of the target application. Thus, there is a problem that the vehicle-mounted terminal cannot display the target application running in the background.

SUMMARY

The objective of the present disclosure includes proposing an improved display method and apparatus, to solve the technical problems mentioned in the Background section.

In a first aspect, the present disclosure provides a display method, including: receiving a display request sent by a vehicle-mounted terminal, the display request including an application identifier of a target application installed on a mobile terminal; in response to the received display request: determining whether the target application is in a running state, and arranging a storage space for the target application; in response to the target application being in a running state: starting to draw an interface of the running target application, and storing, in the storage space, interface data obtained by drawing; performing video encoding on the stored interface data to generate a video stream; and sending the generated video stream to the vehicle-mounted terminal so that the vehicle-mounted terminal displays the interface of the target application according to the video stream.

In a second aspect, the present disclosure provides a display method, including: sending a display request to a mobile terminal, the display request including an application identifier of a target application running on the mobile terminal, wherein the display request is used by the mobile terminal to: in response to receiving the display request: determine whether the target application is in a running state and arrange a storage space for the target application, in response to the target application being in a running state: start to draw an interface of the running target application and store, in the storage space, interface data obtained by drawing, perform video encoding on the stored interface data to generate a video stream, and send the generated video stream to the vehicle-mounted terminal; receiving the video stream sent by the mobile terminal; and displaying the interface of the target application according to the video stream.

In a third aspect, the present disclosure provides a display apparatus, including: a first receiving unit, configured to receive a display request sent by a vehicle-mounted terminal, the display request including an application identifier of a target application installed on a mobile terminal; an arranging unit, configured to in response to the received display request: determine whether the target application is in a running state and arrange a storage space for the target application; a drawing unit, configured to in response to the target application being in a running state: start to draw an interface of the running target application, and store, in the storage space, interface data obtained by drawing; a generation unit, configured to perform video encoding on the stored interface data to generate a video stream; and a sending unit, configured to send the generated video stream to the vehicle-mounted terminal so that the vehicle-mounted terminal displays the interface of the target application according to the video stream.

In a fourth aspect, the present disclosure provides a display apparatus, including: a second sending unit, configured to send a display request to a mobile terminal, the display request including an application identifier of a target application running on the mobile terminal, wherein the display request is used by the mobile terminal to: in response to receiving the display request: determine whether the target application is in a running state and arrange a storage space for the target application, in response to the target application being in a running state: start to draw an interface of the running target application and store, in the storage space, interface data obtained by drawing, perform video encoding on the stored interface data to generate a video stream, and send the generated video stream to the vehicle-mounted terminal; a third receiving unit, configured to receive the video stream sent by the mobile terminal; and a second display unit, configured to display the interface of the target application according to the video stream.

According to the display method and apparatus provided by the present disclosure, in response to a display request of a vehicle-mounted terminal, a storage space is arranged for the target application, and whether the target application is in a running state is monitored; in response to the target application being in a running state: drawing an interface of the target application is started, and interface data obtained by drawing is stored in the storage space; video encoding is performed on the interface data to obtain a video stream, and the video stream is sent to the vehicle-mounted terminal so that the vehicle-mounted terminal displays the interface of the running target application, which may realize the display of the target application by the vehicle-mounted terminal, and is not affected by whether the target application is running in the foreground of the mobile terminal. When the target application is in the background running state, the interface of the running target application may also be displayed on the vehicle-mounted terminal.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
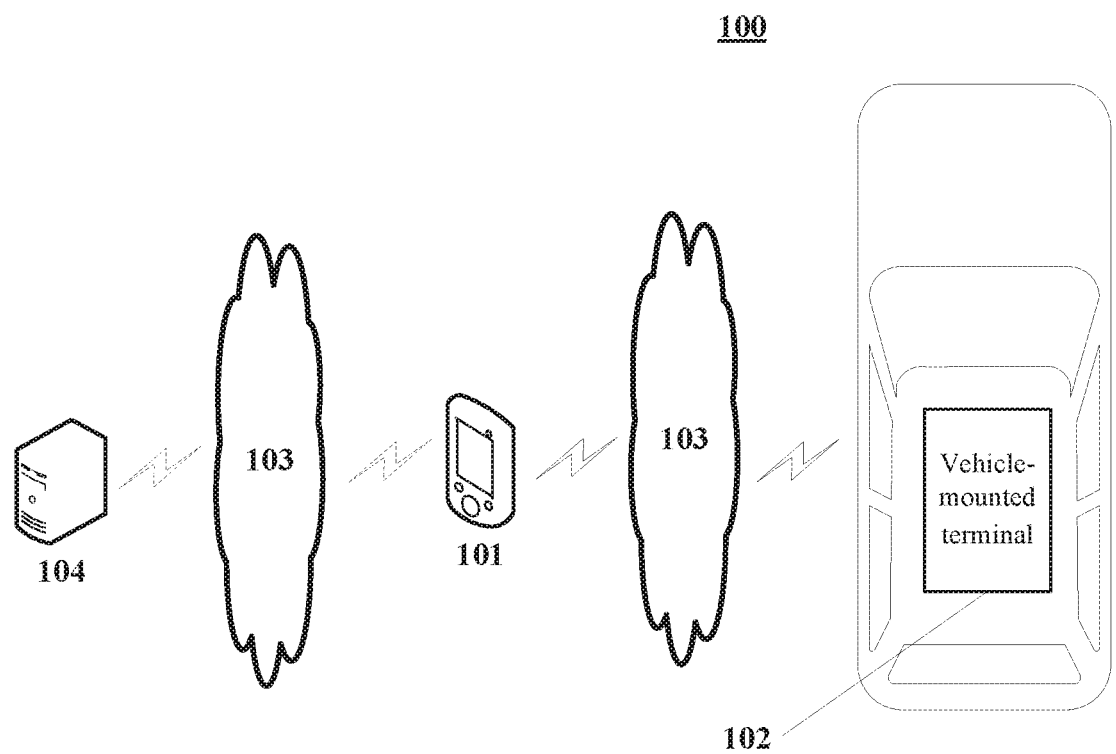
FIG. 1 is an exemplary system architecture diagram to which the present disclosure may be applied.

FIG. 1 illustrates an exemplary system architecture 100 to which an embodiment of a display method or a display apparatus of the present disclosure may be applied.

As shown in FIG. 1, the system architecture 100 may include a mobile terminal 101, a network 103, and a vehicle-mounted terminal 102. The network 103 is used to provide a communication link medium between the mobile terminal 101 and the vehicle-mounted terminal 102, and the vehicle-mounted terminal 102 and a server 104. The network 103 may include a variety of connections, such as wired, wireless communication links, or the like.

The user may interact with the server 104 through the network 103 using the mobile terminal 101 to receive or send messages or the like. The mobile terminal 101 may be installed with various communication client applications, such as map applications, video playback applications, web browser applications, shopping applications, search applications, instant communication tools, mailbox clients, social platform software, or the like.

The mobile terminal 101 may be various electronic devices having display screens and supporting application running, including but not limited to smart phones, tablets, e-book readers, MP3 players (Moving Picture Experts Group Audio Layer III), MP4 (Moving Picture Experts Group Audio Layer IV) players, laptop portable computers, desktop computers, etc.

The vehicle-mounted terminal 102 may be an electronic device having a display screen and supporting a network connection or a communication connection with other electronic devices. The vehicle-mounted terminal may send a display request to the mobile terminal, or may process received data (for example, display the received video stream).

The server 104 may be a server that provides various services, such as a background server that provides support for applications installed on the mobile terminal 101. The background server may perform processing such as analyzing the received data (data such as a positioning request), and feed back the processing result (for example, positioning data of the mobile terminal) to the mobile terminal. It may be understood that if the running of the application on the mobile terminal does not require the support of the server, the server 104 may not be provided in the system architecture 100 shown in FIG. 1.

It should be understood that the number of mobile terminals, vehicle-mounted terminals, networks, and servers in FIG. 1 is merely illustrative. Depending on the implementation needs, there may be any number of terminal devices, networks, and servers.

Figure 2:
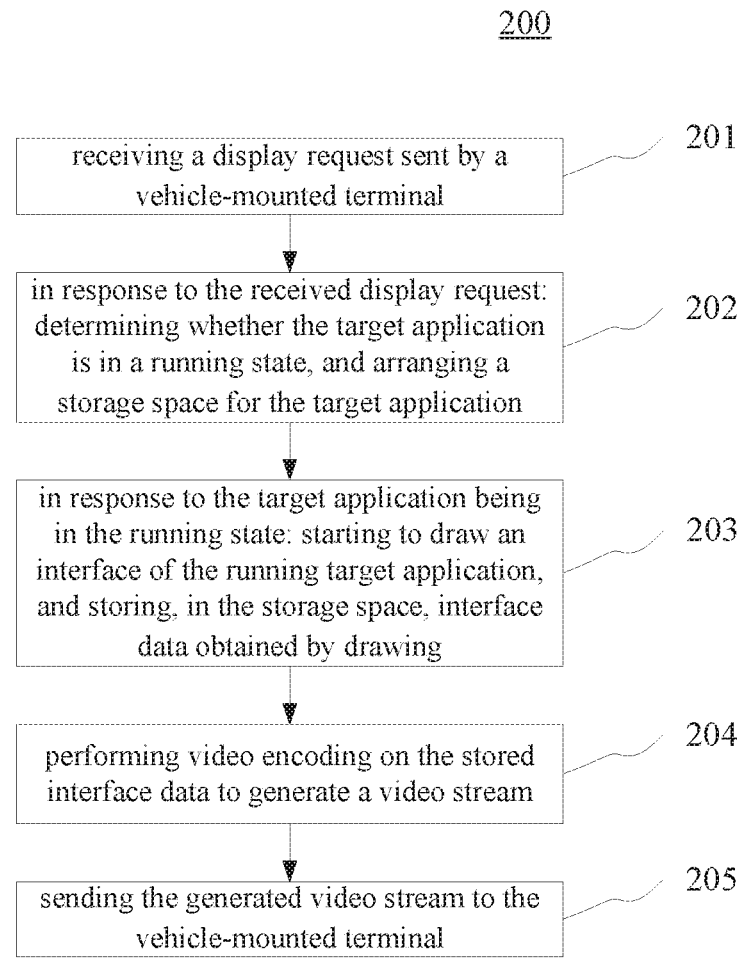
FIG. 2 is a flowchart of an embodiment of a display method according to the present disclosure.

With further reference to FIG. 2, a flow 200 of an embodiment of a display method according to the present disclosure is illustrated. It should be noted that the display method provided by the present embodiment is generally performed by the mobile terminal 101. Accordingly, the display apparatus is generally disposed in the mobile terminal 101. The display method includes the following steps 201 to 205.

Step 201 includes receiving a display request sent by a vehicle-mounted terminal.

In the present embodiment, an electronic device on which the display method operates (for example, the mobile terminal 101 shown in FIG. 1) may receive the display request sent by the vehicle-mounted terminal having a communication channel established in advance with the electronic device. Here, the display request includes an application identifier, and the application identifier is used to indicate a target application installed on the mobile terminal.

Generally, a connection channel is provided in advance between the vehicle-mounted terminal and the mobile terminal. If the user desires to display an application installed on the mobile terminal on the screen of the vehicle-mounted terminal, the user needs to select an icon of the target application desired to be displayed on the screen of the vehicle-mounted terminal. The vehicle-mounted terminal obtains the identifier of the target application based on the target application selected by the user, and the identifier of the target application may be the name of the target application, or other code that may be used by the mobile terminal to identify the target application from many applications. The vehicle-mounted terminal generates the display request according to the application identifier and sends the display request to the mobile terminal.

Step 202 includes in response to the received display request: determining whether the target application is in a running state, and arranging a storage space for the target application.

In the present embodiment, the electronic device on which the display method operates (for example, the mobile terminal 101 shown in FIG. 1) may, in response to the received display request: determine whether the target application is in the running state, and arrange the storage space for the target application.

In the present embodiment, after receiving the display request, the target application is determined according to the application identifier. After determining the target application, whether the target application is in the running state in the mobile terminal is determined.

In the present embodiment, the running state of the target application may include a foreground running state and a background running state.

It may be understood that if the interface of the target application is displayed on the physical screen of the mobile terminal, then the target application runs in the foreground, and interface data of the interface of the target application displayed on the physical screen of the mobile terminal is stored in a frame buffer associated with the physical screen of the mobile terminal.

In the existing technology, the interface of the mobile terminal is displayed to the vehicle-mounted terminal, generally by mirroring data in the frame buffer associated with the physical screen of the mobile terminal, and then transmitting the data obtained by mirroring to the vehicle-mounted terminal.

A disadvantage of the solution of the existing technology is that when the target application is running in the background of the mobile terminal, there is no interface data of the target application in the frame buffer associated with the physical screen of the mobile terminal, such that the vehicle-mounted terminal cannot obtain the interface of the target application.

For example, the target application is a map application, and the map application runs in the foreground of the mobile terminal. In the existing technology, the interface of the map application may be obtained by mirroring the data in the frame buffer associated with the physical screen of the mobile terminal. However, when the mobile terminal receives a phone call, the map application running in the foreground is pushed to the background, the physical screen of the mobile terminal displays a telephone interface, and interface data of the telephone interface is also in the frame buffer associated with the physical screen of the mobile terminal. Correspondingly, the interface data obtained by the vehicle-mounted terminal becomes the interface data of the telephone interface, and the interface of the map application is no longer displayed until the end of the phone call.

In the present embodiment, in response to the received display request, the mobile terminal arranges a storage space for the target application. The storage space arranged here is a storage space arranged for the target application, independent of the existing frame buffer associated with the physical screen of the mobile terminal.

In some alternative implementations of the present embodiment, in response to the target application not being in the running state, the target application is started, or, in other words the target application is run.

Step 203 includes in response to the target application being in the running state: starting to draw an interface of the running target application, and storing, in the storage space, interface data obtained by drawing.

In the present embodiment, the electronic device on which the display method operates (for example, the mobile terminal 101 shown in FIG. 1) may in response to the target application being in a running state: start to draw the interface of the running target application, and store, in the storage space, interface data obtained by drawing.

In the present embodiment, the interface data may refer to interface-related data that can be used to display the interface and obtained after the interface is drawn. As an example, the interface data of the interface may be pixel values of pixels in a frame of image.

In the method of the present embodiment, after starting to draw the interface of the target application, the target application is in the running state, and the interface of the target application is in a changing state, and the interface of the target application in the changing state is continuously drawn.

For example, the target application is a map application, and when the location function of the map application is running, based on the change of the geographic location of the mobile terminal, the location of the mobile terminal in the interface for displaying the location of the mobile terminal in the map application also changes. It may be understood that when the target application runs in the foreground, the mobile terminal re-draws the interface of the target application every predetermined period and displays the re-drawn interface on the physical screen of the mobile terminal. Then, when the map application is running in the background of the mobile terminal, the mobile terminal may also draw the interface in the map application every predetermined period, and store the interface data obtained by drawing in storage space established in response to receiving the display request.

Those skilled in the art may understand that the interface data stored in the storage space arranged for the target application and for responding to the display request is not affected by whether the target application runs in the foreground or the background. Even if there is an incoming phone call, the telephone interface is drawn to store the interface data in the frame buffer associated with the physical screen of the mobile terminal. The interface data sent to the vehicle-mounted terminal is independent of the interface displayed on the physical screen of the mobile terminal.

Therefore, the method provided by the present embodiment solves the problem that the vehicle-mounted terminal cannot display the target application running in the background of the mobile terminal in the existing technology.

Step 204 includes performing video encoding on the stored interface data to generate a video stream.

In the present embodiment, the electronic device on which the display method operates (for example, the mobile terminal 101 shown in FIG. 1) may perform video encoding on the stored interface data to generate the video stream.

It may be understood that the technique of how to perform video coding is known to those skilled in the art and detailed description thereof will be omitted.

In some alternative implementations of the present embodiment, the performing video encoding on the stored interface data to generate a video stream, includes: reading interface data stored in a predetermined time period from the storage space; and performing video encoding based on the read interface data to generate the video stream.

In some alternative implementations of the present embodiment, a display parameter may be adjusted. Here, the display parameter may include: a frequency of drawing the target application, or a video encoding parameter.

Here, the frequency of drawing the target application may affect the power consumption of the mobile terminal. By adjusting the frequency of drawing the target application, a balance may be achieved between reducing the power consumption of the mobile terminal and drawing an application interface of better continuity.

Here, the video coding parameter may include a picture ratio, a resolution, a code rate, or the like, and detailed description thereof will be omitted.

Step 205 includes sending the generated video stream to the vehicle-mounted terminal.

In the present embodiment, the electronic device on which the display method operates (for example, the mobile terminal 101 shown in FIG. 1) may send the generated video stream to the vehicle-mounted terminal. The vehicle-mounted terminal displays the interface of the target application according to the video stream.

In some alternative implementations of the present embodiment, after displaying the interface of the target application, the vehicle-mounted terminal may accept the user operation on the target application, and then the vehicle-mounted terminal transmits operation information of the user to the mobile terminal. The mobile terminal may change the running of the target application based on the operation information of the user.

As an example, the interface of the target application displayed by the vehicle-mounted terminal is a positioning interface for displaying the positioning of the mobile terminal. The user clicks to exit the positioning interface at the vehicle-mounted terminal, and the vehicle-mounted terminal transmits the operation information of the user exit operation to the mobile terminal. After receiving the operation information of the exit operation on the current interface, the mobile terminal executes an operation of exiting the positioning interface. In such case, the subsequent drawn interface of the application of the mobile terminal is an interface other than the positioning interface, for example, the upper-level interface of the positioning interface.

In an application scenario of the present embodiment, the user needs to select a target application desired to be displayed on the screen of the vehicle-mounted terminal, such as a map application, and the vehicle-mounted terminal generates a display request according to the identifier of the map application selected by the user, and sends the display request to the mobile terminal. After that, the mobile terminal may determine whether the map application is in a running state, and arrange a storage space for the map application, and if the map application is not in the running state, run the map application. Then, the mobile terminal may in response to the map application being in the running state: start to draw the interface of the running map application, and store, in the storage space, interface data obtained by drawing. Then, the mobile terminal may perform video encoding on the stored interface data to generate a video stream. Finally, the mobile terminal may send the generated video stream to the vehicle-mounted terminal so that the vehicle-mounted terminal displays the interface of the map application according to the video stream.

According to the display method provided by the present disclosure, in response to a display request of a vehicle-mounted terminal, a storage space is arranged for the target application and whether the target application is in a running state is monitored; in response to the target application being in a running state, drawing an interface of the target application is started, and interface data obtained by drawing is stored in the storage space; video encoding is performed on the interface data to obtain a video stream, and the video stream is sent to the vehicle-mounted terminal so that the vehicle-mounted terminal displays the interface of the running target application, as such the display of the target application by the vehicle-mounted terminal is achieved, which is not affected by whether the target application is running in the foreground of the mobile terminal. When the target application is in the background running state, the interface of the running target application may also be displayed on the vehicle-mounted terminal.

Figure 3:
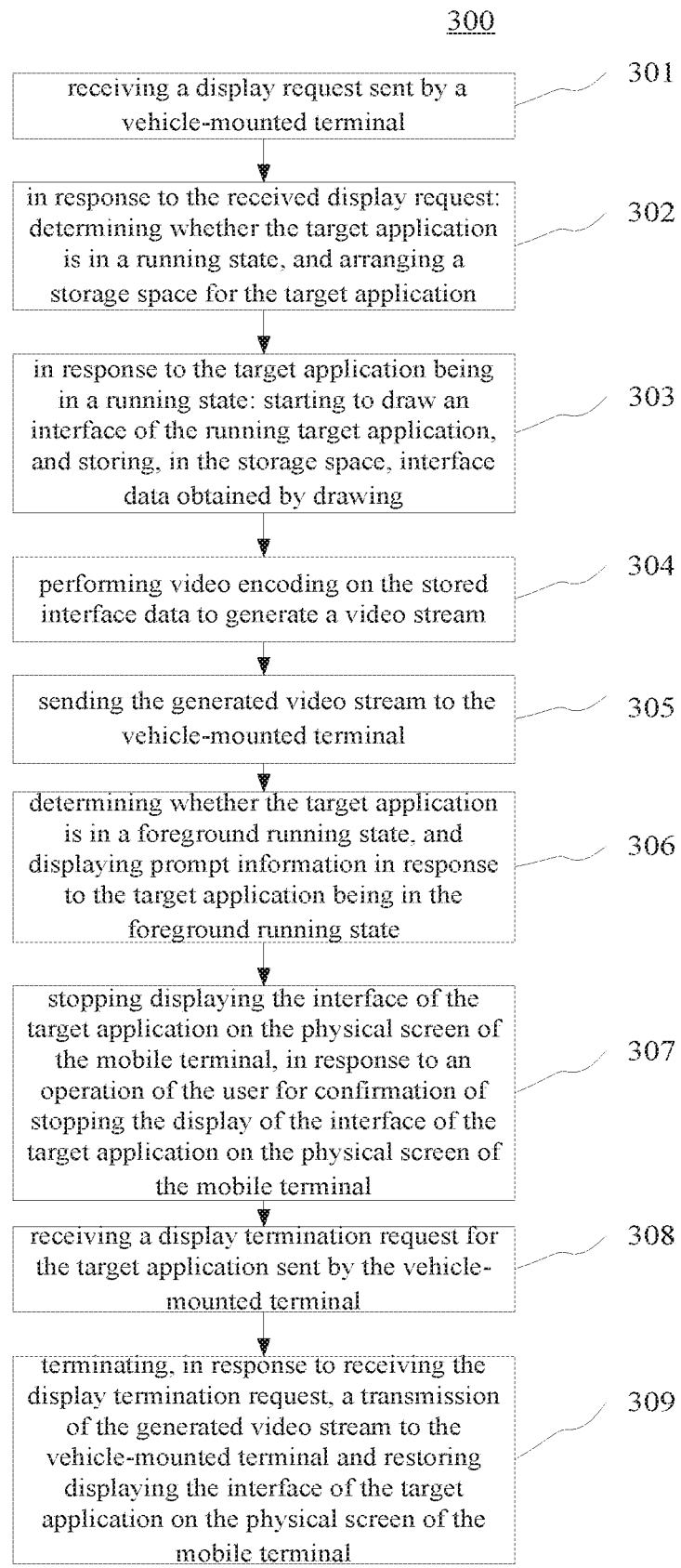
FIG. 3 is a flowchart of another embodiment of the display method according to the present disclosure.

With further reference to FIG. 3, a flow 300 of another embodiment of the display method is illustrated. It should be noted that the display method provided by the present embodiment is generally performed by the mobile terminal 101. Accordingly, the display apparatus is generally disposed in the mobile terminal 101. The flow 300 of the display method includes the following steps 301 to 309.

Step 301 includes receiving a display request sent by a vehicle-mounted terminal.

In the present embodiment, an electronic device on which the display method operates (for example, the mobile terminal 101 shown in FIG. 1) may receive the display request sent by the vehicle-mounted terminal having a communication channel established in advance with the electronic device. Here, the display request includes the application identifier, and the application identifier is used to indicate a target application installed on the mobile terminal.

Step 302 includes in response to the received display request: determining whether the target application is in a running state, and arranging a storage space for the target application.

Step 303 includes in response to the target application being in a running state: starting to draw an interface of the running target application, and storing, in the storage space, interface data obtained by drawing.

Step 304 includes performing video encoding on the stored interface data to generate a video stream.

Step 305 includes sending the generated video stream to the vehicle-mounted terminal.

The implementation details and technical effects of the steps 301 to 305 may refer to the related descriptions in the steps 202 to 205, and detailed description thereof will be omitted.

Step 306 includes determining whether the target application is in a foreground running state, and displaying prompt information in response to the target application being in the foreground running state.

In the present embodiment, the electronic device on which the display method operates (for example, the mobile terminal 101 shown in FIG. 1) may display prompt information, in response to the target application being in the foreground running state. Here, the prompt information is used to prompt the user to determine whether to stop displaying the interface of the target application on the physical screen of the mobile terminal.

Generally, after the user sees the prompt information, a corresponding operation is performed according to the prompt information. Here, the corresponding operation may be a confirmation operation or a negative operation for stopping the display of the interface of the target application on the physical screen of the mobile terminal.

Step 307 includes stopping displaying the interface of the target application on the physical screen of the mobile terminal, in response to an operation of the user for confirmation of stopping the display of the interface of the target application on the physical screen of the mobile terminal.

In the present embodiment, the electronic device on which the display method operates (for example, the mobile terminal 101 shown in FIG. 1) may stop displaying the interface of the target application on the physical screen of the mobile terminal, in response to the operation of the user for confirmation of stopping the display of the interface of the target application on the physical screen of the mobile terminal.

Here, the stopping displaying the interface of the target application on the physical screen of the mobile terminal, and displaying the interface of the target application only on the vehicle-mounted terminal, may save the power consumption of the mobile terminal.

Step 308 includes receiving a display termination request for the target application sent by the vehicle-mounted terminal.

In the present embodiment, the electronic device on which the display method operates (for example, the mobile terminal 101 shown in FIG. 1) may receive the display termination request for the target application sent by the vehicle-mounted terminal. Here, the display termination request may be information for the vehicle-mounted terminal to request the mobile terminal to terminate the display of the interface of the target application.

Step 309 includes terminating, in response to receiving the display termination request, a transmission of the generated video stream to the vehicle-mounted terminal and restoring displaying the interface of the target application on the physical screen of the mobile terminal.

In the present embodiment, the electronic device on which the display method operates (for example, the mobile terminal 101 shown in FIG. 1) may terminate, in response to receiving the display termination request, the transmission of the generated video stream to the vehicle-mounted terminal and restore displaying the interface of the target application on the physical screen of the mobile terminal.

Here, after the display of the interface of the target application on the vehicle-mounted terminal is stopped, the restoring displaying the interface of the target application on the mobile terminal may make the display of the target application have no time blank, enable seamlessly switch between the mobile terminal and the vehicle-mounted terminal, thus further improving the display of the target application.

As can be seen from FIG. 3, compared with the embodiment corresponding to FIG. 2, the flow 300 of the display method in the present embodiment highlights the step of terminating the display of the target application on the physical screen of the mobile terminal according to the user selection in response to the target application being in a foreground running state, the step of terminating, in response to receiving the display termination request sent by the vehicle-mounted terminal, a transmission of the generated video stream to the vehicle-mounted terminal and restoring displaying the interface of the target application on the physical screen of the mobile terminal, thereby implementing a more comprehensive alternate display scheme for the target application by the vehicle-mounted terminal and the mobile terminal.

Figure 4:
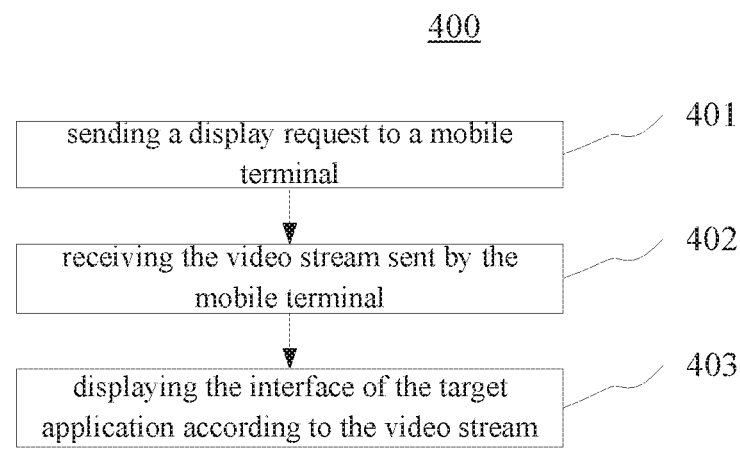
FIG. 4 is a flowchart of an embodiment of another display method according to the present disclosure.

With further reference to FIG. 4, a flow 400 of an embodiment or another display method is illustrated. It should be noted that the display method provided by the present embodiment is generally performed by the vehicle-mounted terminal 102. Accordingly, the display apparatus is generally disposed in the vehicle-mounted terminal 102. The flow 400 of the display method includes the following steps 401 to 403.

Step 401 includes sending a display request to a mobile terminal.

In the present embodiment, an electronic device on which the display method operates (for example, the mobile terminal 101 shown in FIG. 1) may send the display request to a mobile terminal. Here, the display request includes an application identifier of a target application running on the mobile terminal. The mobile terminal may, in response to receiving the display request: determine whether the target application is in a running state, and arrange a storage space for the target application; in response to the target application being in a running state: start to draw an interface of the running target application, and store, in the storage space, interface data obtained by drawing; perform video encoding on the stored interface data to generate a video stream, and send the generated video stream to the vehicle-mounted terminal.

Step 402 includes receiving the video stream sent by the mobile terminal.

In the present embodiment, the electronic device on which the display method operates (for example, the mobile terminal 101 shown in FIG. 1) may receive the video stream sent by the mobile terminal.

Step 403 includes displaying the interface of the target application according to the video stream.

In the present embodiment, the electronic device on which the display method operates (for example, the mobile terminal 101 shown in FIG. 1) may display the interface of the target application according to the video stream.

The implementation details and technical effects of the display method provided by the present embodiment may refer to the related descriptions in other embodiments of the present disclosure, and detailed description thereof will be omitted.

Figure 5:
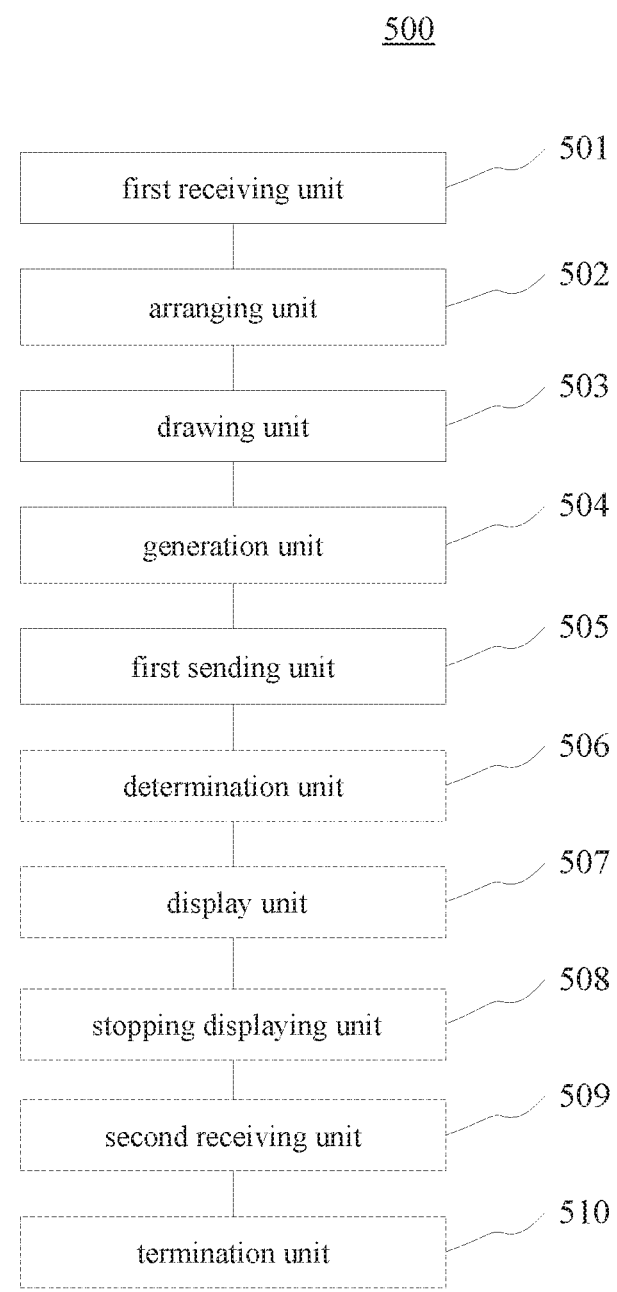
FIG. 5 is a schematic structural diagram of an embodiment of a display apparatus according to the present disclosure.

With further reference to FIG. 5, as an implementation of the method shown in FIG. 2 and FIG. 3, the present disclosure provides an embodiment of a display apparatus, and the apparatus embodiment corresponds to the method embodiment as shown in FIG. 2, and the apparatus may be specifically applied to various electronic devices.

As shown in FIG. 5, the display apparatus 500 of the present embodiment includes: a first receiving unit 501, an arranging unit 502, a drawing unit 503, a generation unit 504 and a first sending unit 505. The first receiving unit 501 is configured to receive a display request sent by a vehicle-mounted terminal, the display request including an application identifier of a target application installed on a mobile terminal. The arranging unit 502 is configured to, in response to the received display request: determine whether the target application is in a running state, and arrange a storage space for the target application. The drawing unit 503 is configured to in response to the target application being in a running state: start to draw an interface of the running target application, and store, in the storage space, interface data obtained by drawing. The generation unit 504 is configured to perform video encoding on the stored interface data to generate a video stream. The first sending unit 505 is configured to send the generated video stream to the vehicle-mounted terminal so that the vehicle-mounted terminal displays the interface of the target application according to the video stream.

In the present embodiment, the specific processing and the technical effects thereof of the first receiving unit 501, the arranging unit 502, the drawing unit 503, the generation unit 504 and the first sending unit 505 of the display apparatus 500 may respectively refer to the related descriptions of step 201, step 202, step 203, step 204 and step 205 in the corresponding embodiment of FIG. 2, and detailed description thereof will be omitted.

In some alternative implementations of the present embodiment, the display apparatus 500 may further include: a determination unit 506, configured to determine whether the target application is in a foreground running state; a display unit 507, configured to display prompt information, in response to the target application being in a foreground running state, where the prompt information is used to prompt a user to determine whether to stop displaying the interface of the target application on a physical screen of the mobile terminal; and a stopping displaying unit 508, configured to stop displaying the interface of the target application on the physical screen of the mobile terminal, in response to a user operation of confirmation of stopping displaying the interface of the target application on the physical screen of the mobile terminal. The specific processing and the technical effects thereof of the determination unit 506, the display unit 507 and the stopping displaying unit 508 may respectively refer to the related descriptions of step 306 and step 307 in the corresponding embodiment of FIG. 3, and detailed description thereof will be omitted.

In some alternative implementations of the present embodiment, the display apparatus 500 may further include: a second receiving unit 509, configured to receive a display termination request for the target application sent by the vehicle-mounted terminal; and a termination unit 510, configured to terminate, in response to receiving the display termination request, a transmission of the generated video stream to the vehicle-mounted terminal and restore displaying the interface of the target application on the physical screen of the mobile terminal. The specific processing and the technical effects thereof of the second receiving unit 509 and the termination unit 510 may respectively refer to the related descriptions of step 308 and step 309 in the corresponding embodiment of FIG. 3, and detailed description thereof will be omitted.

In some alternative implementations of the present embodiment, the display apparatus 500 may further include: a running unit 511, configured to run the target application, in response to the target application not being in a running state.

Figure 6:
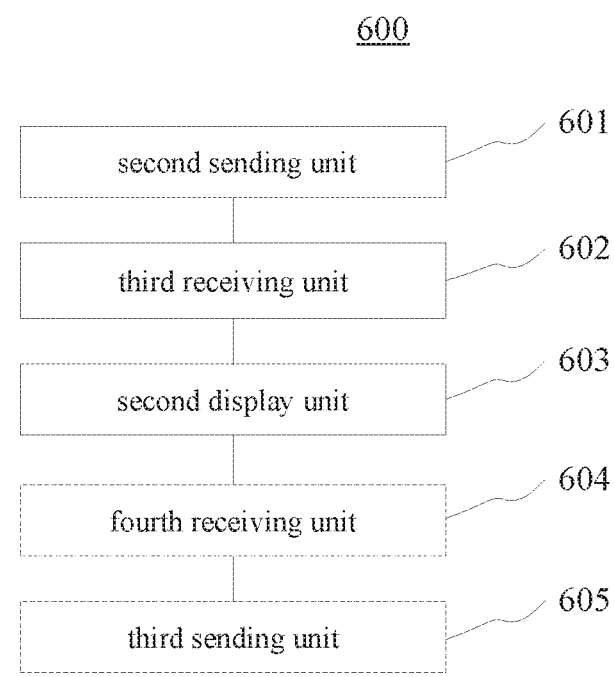
FIG. 6 is a schematic structural diagram of an embodiment of another display apparatus according to the present disclosure.

With further reference to FIG. 6, as an implementation of the method shown in FIG. 4, the present disclosure provides an embodiment of a display apparatus, and the apparatus embodiment corresponds to the method embodiment as shown in FIG. 4, and the apparatus may be specifically applied to various electronic devices.

As shown in FIG. 6, the display apparatus 600 of the present embodiment includes: a second sending unit 601, a third receiving unit 602 and a second display unit 603. The second sending unit 601 is configured to send a display request to a mobile terminal, the display request including an application identifier of a target application running on the mobile terminal; where the display request is used by the mobile terminal to: in response to receiving the display request, determine whether the target application is in a running state and arrange a storage space for the target application; in response to the target application being in a running state, start to draw an interface of the running target application and store, in the storage space, interface data obtained by drawing; perform video encoding on the stored interface data to generate a video stream; and send the generated video stream to the vehicle-mounted terminal. The third receiving unit 602 is configured to receive the video stream sent by the mobile terminal. The second display unit 603 is configured to display the interface of the target application according to the video stream.

In the present embodiment, the specific processing and the technical effects thereof of the second sending unit 601, the third receiving unit 602 and the second display unit 603 of the display apparatus 600 may respectively refer to the related descriptions of step 401, step 402 and step 403 in the corresponding embodiment of FIG. 4, and detailed description thereof will be omitted.

In some alternative implementations of the present, embodiment, the display apparatus 600 may further include: a fourth receiving unit 604, configured to receive a closing operation on the target application by a user; and a third sending unit 605, configured to send, in response to receiving the closing operation, a display termination request to the mobile terminal for the mobile terminal to terminate a transmission of the generated video stream to the vehicle-mounted terminal according to the display termination request.

Figure 7:
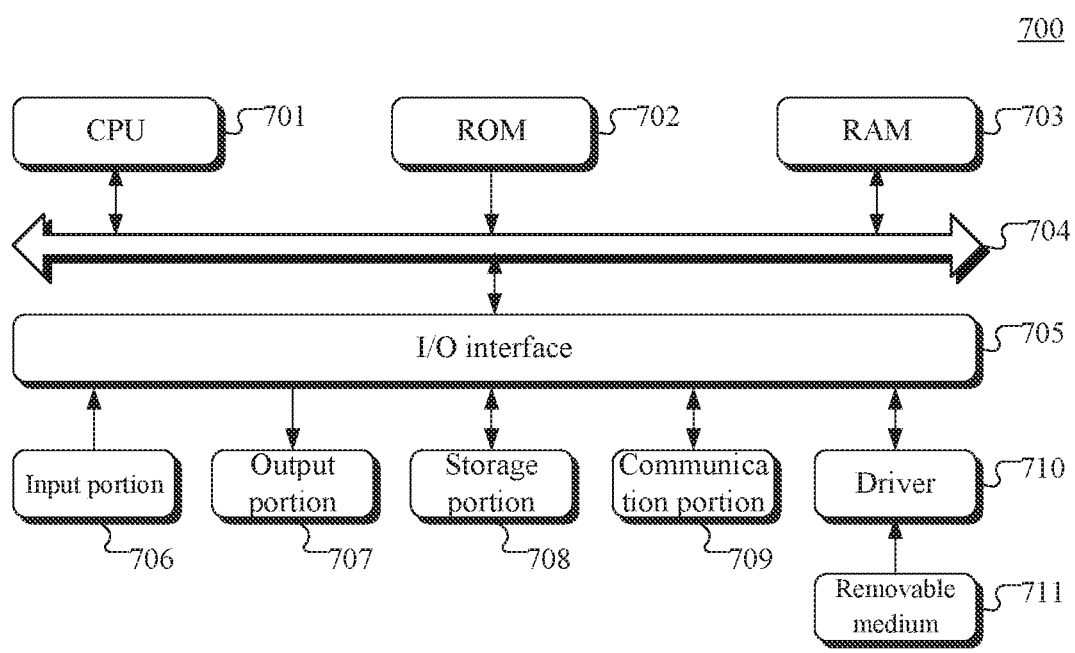
FIG. 7 is a schematic structural diagram of a computer system adapted to implement a terminal device of the embodiments of the present disclosure.

With further reference to FIG. 7, a schematic structural diagram of a computer system 700 adapted to implement a terminal device of the embodiments of the present disclosure is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including such as a cathode ray tube (CRT), a liquid crystal display device (LCD), a speaker, etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the method of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a first receiving unit, an arranging unit, a drawing unit, a generation unit and a first sending unit. Here, the names of these units do not in some cases constitute limitations to such units themselves. For example, the first receiving unit may also be described as "a unit for receiving a display request". The described units may also be described as: a processor including a second sending unit, a third receiving unit and a second display unit. Here, the names of these units do not in some cases constitute limitations to such units themselves. For example, the second sending unit may also be described as "a unit for sending a display request".

In another aspect, the present disclosure further provides a non-volatile computer storage medium. The non-volatile computer storage medium may be included in the apparatus in the above described embodiments, or a stand-alone non-volatile computer storage medium not assembled into the apparatus. The non-volatile computer storage medium stores one or more programs. The one or more programs, when executed by a device, cause the device to: receive a display request, sent by a vehicle-mounted terminal, the display request including an application identifier of a target application installed on a mobile terminal; in response to the received display request: determine whether the target application is in a running state, and arrange a storage space for the target application; in response to the target application being in a running state: start to draw an interface of the running target application, and store, in the storage space, interface data obtained by drawing; perform video encoding on the stored interface data to generate a video stream; and send the generated video stream to the vehicle-mounted terminal so that the vehicle-mounted terminal displays the interface of the target application according to the video stream.

In another aspect, the present disclosure further provides a non-volatile computer storage medium. The non-volatile computer storage medium may be included in the apparatus in the above described embodiments, or a stand-alone non-volatile computer storage medium not assembled into the apparatus. The non-volatile computer storage medium stores one or more programs. The one or more programs, when executed by a device, cause the device to: send a display request to a mobile terminal, the display request including an application identifier of a target application running on the mobile terminal; where the display request is used by the mobile terminal to: in response to receiving the display request, determine whether the target application is in a running state and arrange a storage space for the target application; in response to the target application being in a running state, start to draw an interface of the running target application and store, in the storage space, interface data obtained by drawing; perform video encoding on the stored interface data to generate a video stream; and send the generated video stream to the vehicle-mounted terminal; receive the video stream sent by the mobile terminal; and display the interface of the target application according to the video stream.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A display method, the method comprising:
receiving a display request sent by a vehicle-mounted terminal, the display request comprising an application identifier of a target application installed on a mobile terminal;
in response to the received display request: determining whether the target application is in a running state, and arranging a storage space for the target application;
in response to the target application being in the running state: starting to draw an interface of the running target application, and storing, in the storage space, interface data obtained by drawing;
performing video encoding on the stored interface data to generate a video stream; and
sending the generated video stream to the vehicle-mounted terminal so that the vehicle-mounted terminal displays the interface of the target application according to the video stream.

2. The method according to claim 1, wherein the method further comprises:
determining whether the target application is in a foreground running state;
displaying prompt information, in response to the target application being in the foreground running state, wherein the prompt information is used to prompt a user to determine whether to stop displaying the interface of the target application on a physical screen of the mobile terminal; and
stopping displaying the interface of the target application on the physical screen of the mobile terminal, in response to a user operation of confirmation of stopping displaying the interface of the target application on the physical screen of the mobile terminal.

3. The method according to claim 2, wherein the method further comprises:
receiving a display termination request for the target application sent by the vehicle-mounted terminal; and
in response to receiving the display termination request: terminating a transmission of the generated video stream to the vehicle-mounted terminal and restoring displaying the interface of the target application on the physical screen of the mobile terminal.

4. The method according to claim 1, wherein, before the starting to draw an interface of the running target application, and storing, in the storage space, interface data obtained by drawing, in response to the target application being in the running state, the method further comprises:
running the target application, in response to the target application not being in the running state.

5. The method according to claim 4, wherein the method further comprises:
adjusting a display parameter, wherein the display parameter comprises at least one of: a frequency of drawing the target application, or a video encoding parameter.

6. A non-transitory non-volatile computer storage medium, storing computer readable instructions executable by a processor, the computer readable instructions, when executed by the processor, cause the processor to implement the method according to claim 1.

7. A display method, the method comprising:
sending a display request to a mobile terminal, the display request comprising an application identifier of a target application running on the mobile terminal, wherein the display request is used by the mobile terminal to: in response to receiving the display request: determine whether the target application is in a running state and arrange a storage space for the target application, in response to the target application being in a running state: start to draw an interface of the running target application and store, in the storage space, interface data obtained by drawing, perform video encoding on the stored interface data to generate a video stream, and send the generated video stream to the vehicle-mounted terminal;
receiving the video stream sent by the mobile terminal; and
displaying the interface of the target application according to the video stream.

8. The method according to claim 7, wherein the method further comprises:
receiving a closing operation of a user on the target application; and
sending, in response to receiving the closing operation, a display termination request to the mobile terminal for the mobile terminal to terminate a transmission of the generated video stream to the vehicle-mounted terminal according to the display termination request.

9. A display apparatus, the apparatus comprising:
at least one processor; and a memory storing instructions, wherein the instructions when executed by the at least one processor, cause the at least one processor to perform the method according to claim 7.

10. A non-transitory non-volatile computer storage medium, storing computer readable instructions executable by a processor, the computer readable instructions, when executed by the processor, cause the processor to implement the method according to claim 7.

11. A display apparatus, the apparatus comprising:
at least one processor; and
a memory storing instructions, wherein the instructions when executed by the at least one processor, cause the at least one processor to perform operations, the operations comprising:
receiving a display request sent by a vehicle-mounted terminal, the display request comprising an application identifier of a target application installed on a mobile terminal;
in response to the received display request: determining whether the target application is in a running state and arranging a storage space for the target application;
in response to the target application being in the running state: starting to draw an interface of the running target application, and storing, in the storage space, interface data obtained by drawing;
performing video encoding on the stored interface data to generate a video stream; and
sending the generated video stream to the vehicle-mounted terminal so that the vehicle-mounted terminal displays the interface of the target application according to the video stream.

12. The apparatus according to claim 11, wherein the operations further comprise:
determining whether the target application is in a foreground running state;
displaying prompt information, in response to the target application being in the foreground running state, wherein the prompt information is used to prompt a user to determine whether to stop displaying the interface of the target application on a physical screen of the mobile terminal; and
stopping displaying the interface of the target application on the physical screen of the mobile terminal, in response to a user operation of confirmation of stopping displaying the interface of the target application on the physical screen of the mobile terminal.

13. The apparatus according to claim 12, wherein the operations further comprise:
receiving a display termination request for the target application sent by the vehicle-mounted terminal; and
in response to receiving the display termination request: terminating a transmission of the generated video stream to the vehicle-mounted terminal and restoring displaying the interface of the target application on the physical screen of the mobile terminal.

14. The apparatus according to claim 11, wherein the operations further comprise:
running the target application, in response to the target application not being in a running state.

* * * * *